Figure 1:
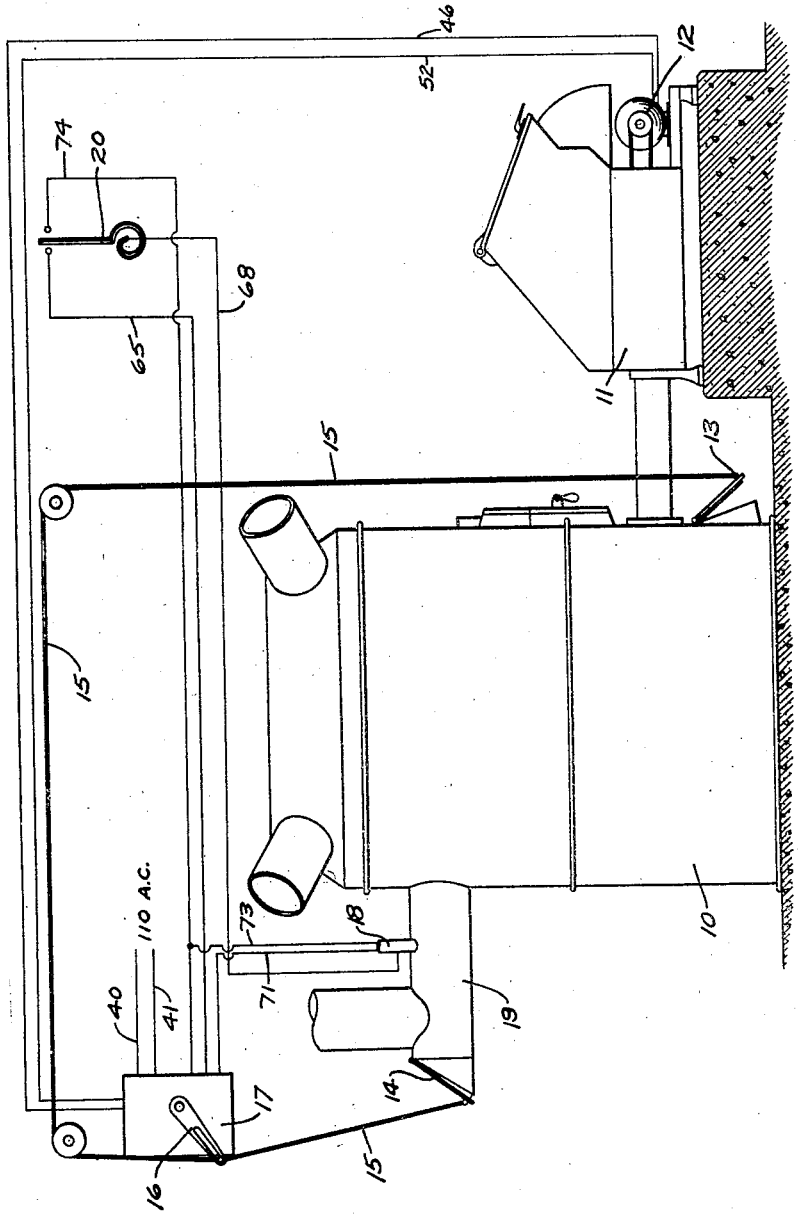

May 18, 1943.  A. T. RANKIN  2,319,774
STOKER CONTROL
Filed June 24, 1939    5 Sheets-Sheet 1

INVENTOR
ARMAND T. RANKIN,
BY Minturn & Minturn,
ATTORNEYS

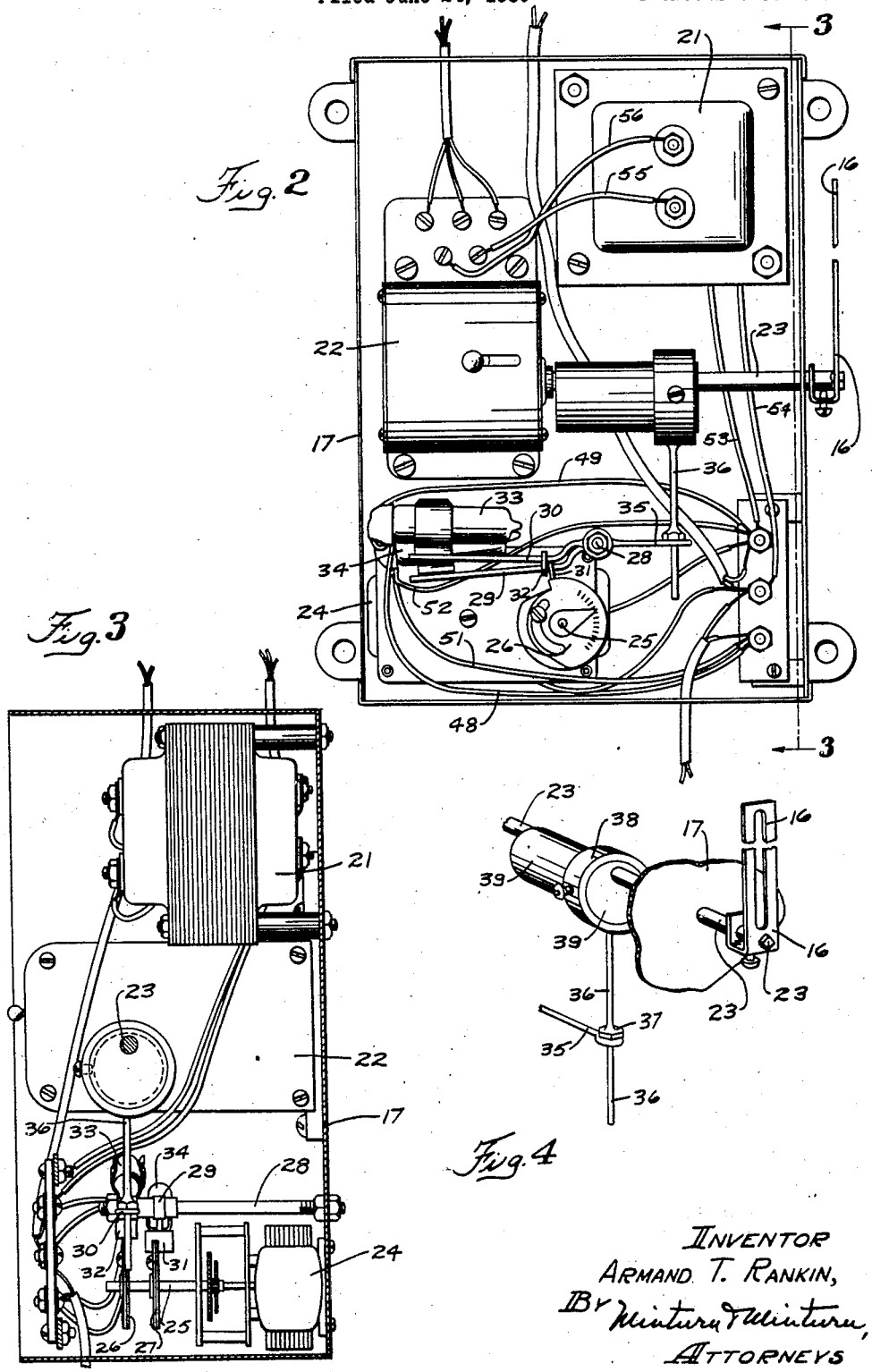

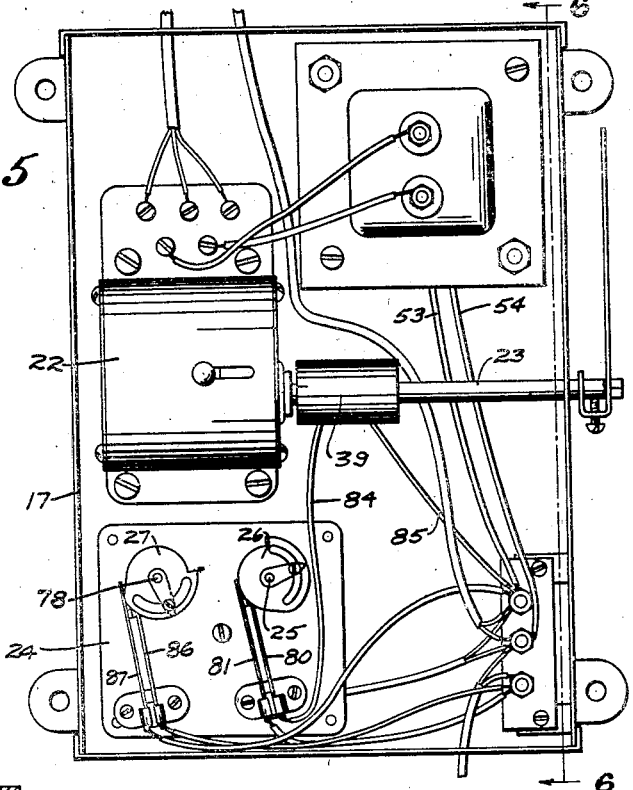
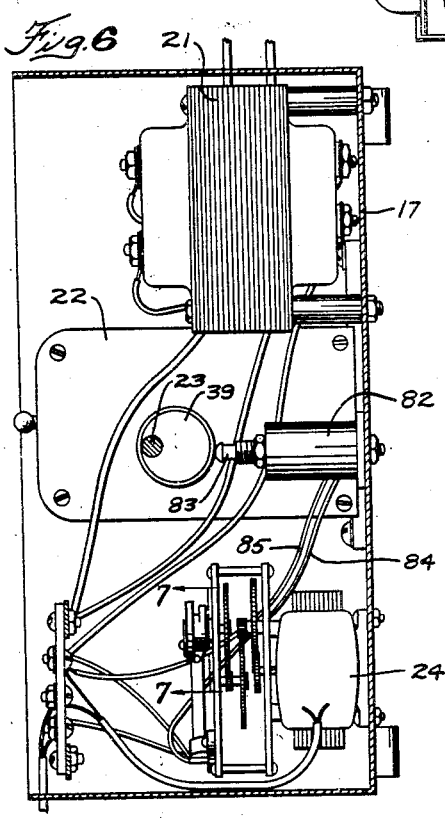
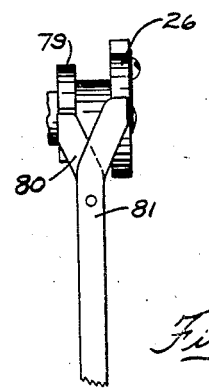

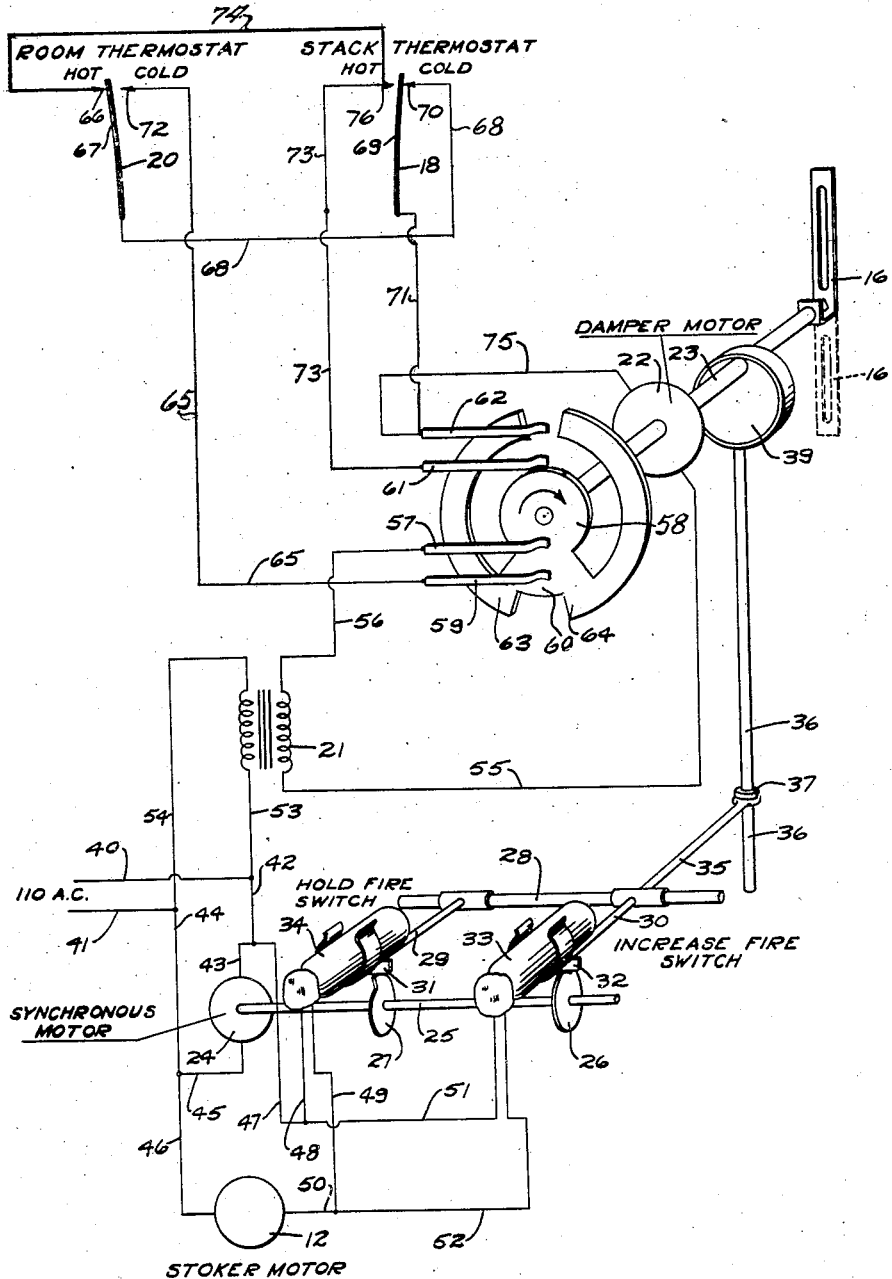

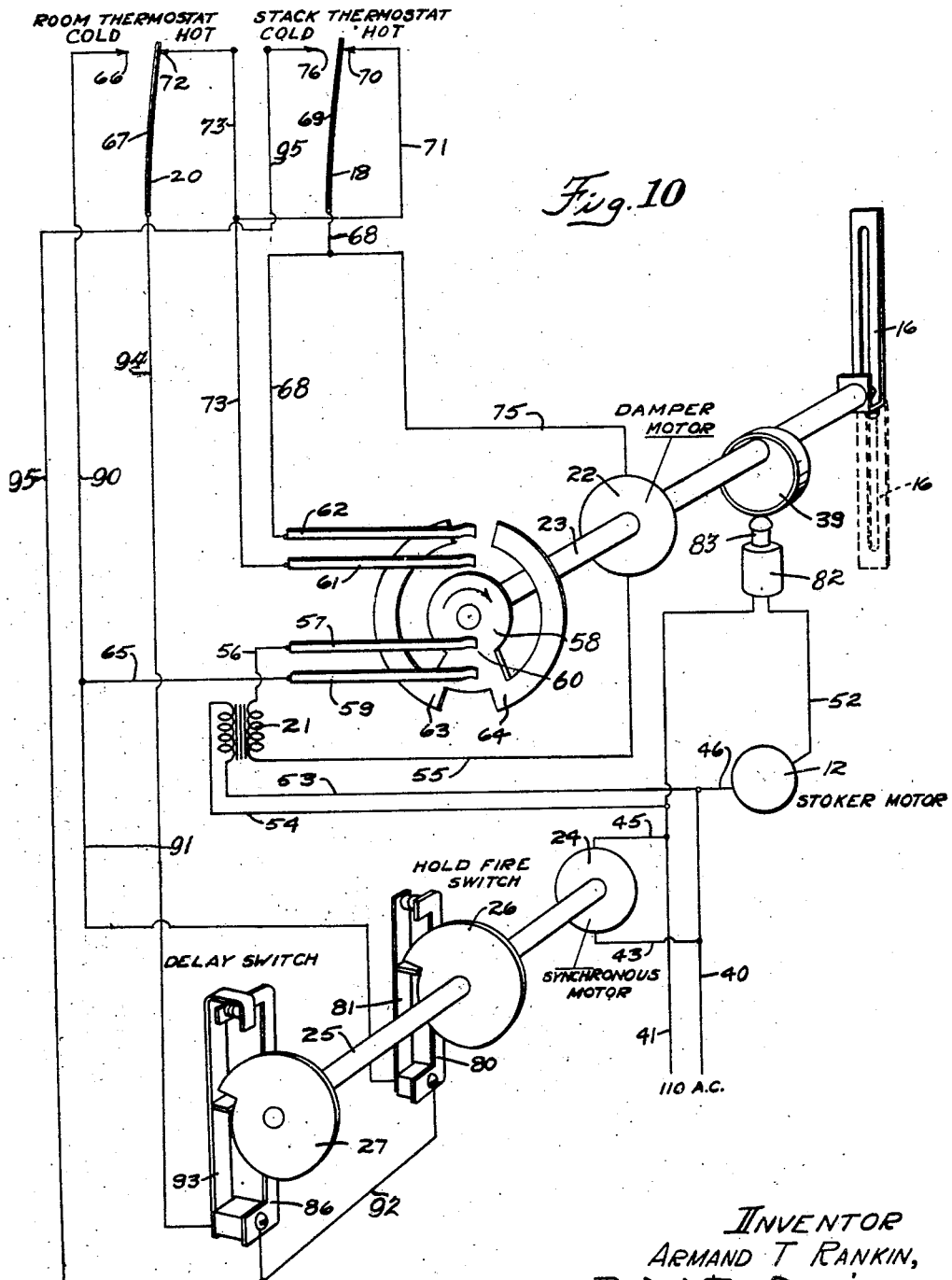

Patented May 18, 1943

2,319,774

UNITED STATES PATENT OFFICE 2,319,774

STOKER CONTROL

Armand T. Rankin, Indianapolis, Ind., assignor, by direct and mesne assignments, of one-half to Sun-Fire Stoker Corporation, a corporation of Indiana, and one-fourth to William J. Bash, Champaign, Ill.

Application June 24, 1939, Serial No. 280,900

7 Claims. (Cl. 236—9)

This invention relates to means for controlling the operation of a stoker for supplying fuel to a combustion zone in a furnace or the like, and has for a primary object the provision of a structure that is exceedingly simple and at the same time highly efficient in maintaining the rate of combustion within limits as predetermined. The invention is equally well adapted to natural draft as to forced draft conditions, the structure being particularly suitable in natural draft installations.

The invention provides means for positively opening and closing dampers in accordance with the demand for heat automatically under the control of thermostats in both the space to be heated and either in the stack or in the dome of the furnace as a high limit control. The entire control, not including the thermostats just indicated, may be assembled within a convenient receptacle which may be mounted at selected positions adjacent the furnace depending upon the particular location and availability of space.

These and many other objects and advantages of the invention will become apparent to those versed in the art in the following description of the invention as illustrated more or less diagrammatically in the accompanying drawings, in which Fig. 1 is a diagrammatic layout in side elevation of a heating system to which the invention is applied;

Fig. 2, a front elevation of the control box assembly with the front cover removed;

Fig. 3, a vertical transverse section on the line 3—3 in Fig. 2;

Fig. 4, a detail in perspective of the hold-fire switch mechanism;

Fig. 5, a front elevation of a structure slightly modified from that as shown in Fig. 2;

Fig. 6, a vertical transverse section on the line 6—6 in Fig. 5;

Fig. 7, a detail in vertical section on the line 7—7 in Fig. 6;

Fig. 8, a detail in side elevation of a switch unit shown in Fig. 5;

Fig. 9, a schematic wiring diagram applying to natural draft; and

Fig. 10, a schematic wiring diagram for forced draft conditions.

Like characters of reference indicate like parts throughout the several views in the drawings.

Referring to Fig. 1, a conventional type furnace 10 is shown as having a conventional type stoker 11 connected therewith and operated by an electric motor 12. The ash pit damper 13 (natural draft being employed in the present example) and a stack damper door 14 are interconnected through a suitable cable 15 with the arm 16 extending from the control box 17. A high temperature limit thermostat unit 18 is employed either in the dome of the furnace or in the stack, herein shown as a unit 18 mounted in the stack 19. A room thermostat 20 is placed in a room or space to be heated by the furnace 10. The room thermostat 20 and the stack thermostat 18 and also the motor 12 are electrically interconnected to devices within the control box 17 as will hereinafter more fully be explained. Current from a suitable source is carried through suitable conductors into the control box 17.

The control box 17 is shown on an enlarged scale with the front cover removed in Figs. 2–4 to illustrate the units therein. Where it is desired to employ a low voltage current, particularly in connection with the room thermostat, a transformer 21 is mounted within the box 17 to step down the current from the usual 110 volt source to 17 volts. A damper operating motor 22 of the usual and well known type (the details of which do not enter into the present invention) carries a final drive shaft 23 to extend therefrom horizontally outwardly through a wall of the box 17 to carry the lever 16 on its outer end externally of the box. A synchronous motor 24 is mounted in the box 17 below the motor 22 and has a final drive shaft 25 extending forwardly therefrom to carry a pair of spaced apart cams 26 and 27, each adjustable for peripheral contour.

A post 28 extends forwardly from the rear wall of the box 17 to carry a pair of rockers 29 and 30 thereon, each normally individually free to drop by gravity to carry cam followers 31 and 32 into the paths respectively of the cams 27 and 26. Each of the rockers 29 and 30 carries a mercury tube switch 33 and 34 respectively. The rocker 30 has an arm 35 extending beyond the post 28 to terminate in an eye through which a rod 36 passes, vertically and freely. The rod 36 carries a stop 37 limiting travel through the eye of the arm 35 so that the arm 35 may be pushed downwardly by pushing the stop 37 thereagainst.

The upper end of the rod 36 is connected to a cam follower 38 which is slidingly fitted about the periphery of a cam 39 that is fixed on the damper motor shaft 23. For every revolution of the damper motor shaft 23, the stop 37 on the rod 36 will push downwardly on the arm 35 and then lift upwardly to permit the return of the arm 35 to its normal upper position.

Referring now to Fig. 9, a pair of wires 40 and 41 lead from any suitable source of current, for example 110 volts A. C., to connect with the synchronous motor 24 through the wires 42, 43, 44 and 45 whereby the motor 24 is in continuous operation as long as any current is available in the wires 40 and 41. This means that the cams 26 and 27 are continuously rotating at a constant speed determined by the gear ratio selected between the armature of the synchronous motor and its final drive shaft 25.

The stoker motor 12 is intermittently operated for low fire maintenance by the opening and closing of the switch 34 as determined by the cam 27. From the wire 44 is a wire 46 connecting directly with the motor 12, while from the wire 42 there leads a wire 47, and the wire 48 to the switch 34, from the other side of which is carried a wire 49 to the wire 50 which connects with the other side of the motor 12. Thus the motor 12 operates when the cam 27 is turned to close the switch 34 and ceases to operate when the switch 34 is lifted from its closed position to its open position, that position being indicated in Fig. 9. This operation of the stoker motor will continue independently of any demand for heat or lack of demand for heat in the space to be heated. For increasing the rate of combustion by supplying additional fuel, the second switch 33 is brought into operation by its operating cam 26 in between operations of the switch 34, the cam 26 being turned on its shaft 25 to that required position. The switch 33 is in parallel connection with the switch 34 through the wires 51 and 52. The switch 33 is the switch that controls the feeding of additional fuel to the combustion zone as the call for additional heat is made by the room thermostat.

Where the transformer 21 is employed, its primary is connected between the wires 40 and 41 by the respective wires 53 and 54. The secondary winding of the transformer 21 has a wire 55 carried therefrom directly to the damper motor 22. The other side of the secondary winding has a wire 56 leading therefrom to connect with a brush 57 to be in the path of a segment 58 of a commutator fixed to the shaft 23 of the motor 22. In the present form, this brush 57 is in continuous contact for 360 degrees of travel of the central circular segment 58 of the commutator. A second brush 59 is mounted to have an end spaced below the brush 57 to be in the path only of the segment 60 of the commutator. A third brush 61 is mounted above the brush 57 to be in the path of the same segment 60. A fourth brush 62 is mounted above the brush 61 to be in a third path in which the two curved major segments 63 and 64 travel. As indicated, these two segments 63 and 64 are a trifle less than 180 degrees in length and have adjacent ends at the top in the position shown, united through the segment 60 with the central segment 58 while the other ends of the segments 63 and 64 are spaced apart one from the other. Also it is to be noted that immediately below the segment 60 there is a central gap left between the ends of the segments 63 and 64.

The damper motor 22 has been operated to bring the commutator to the position shown in Fig. 9 which is that position where the furnace dampers have been operated to an "off" or hold fire condition, that is, the damper 13 has been closed and the damper 14 opened, Fig. 1. Likewise the room thermostat element 20 has left the contact member 72 and traveled to some position either intermediate that contact 72 or entirely over against the contact 66, Fig. 9. It is assumed in this setting that the furnace is operating following a satisfied call for heat and that the stack temperature is still within the safe limits wherein the stack bimetal member 18 is in contact with the "cold" contact member 70.

Now assuming that the room thermostat 20 again calls for heat, this condition will be indicated when the bimetal member 67 has traveled back against the contact member 72. When this happens, a circuit is closed from the contact member 72 through the wire 65, brush 59, commutator segment 60, commutator segment 58, brush 57, wire 56, transformer winding 21, wire 55, damper motor 22, wire 75, wire 71, thermostat element 18, contact member 70, wire 68, thermostat element 67, completing the circuit back to the contact member 72. Thus with the connections made as described and illustrated in Fig. 9, the damper motor is set in operation which, of course, involves the commutator as well as the cam 39. Current from the winding 21 continues to be supplied to the motor 22 after the commutator starts revolving in the direction of the air indicated for substantially 180 degrees of travel of that commutator and, of course, of the shaft 23 and the cam 39 thereon. This supply of current is obtained by reason of the fact that by the time the segment 60 leaves the brush 59, the segment 63 has come into contact with the brush 62 so that current from the winding 21 is then carried across the commutator segments 58, 60 and 63 through the brush 62 and the wire 75 to the motor 22, the return wire being the same wire 56. The circuit is interrupted when the commutator segments reach the positions 180 degrees from those shown in Fig. 9.

Now should for some reason the furnace become overheated before the demand is satisfied in the room in which the thermostat 20 is positioned, and the stack thermostat 18 has its bimetal member 69 shift over to the contact member 76, the circuit still remaining closed in the thermostat 20 between the elements 67 and 72, a circuit will be closed through the members as follows: contact member 76, wire 73, brush 61, commutator segment 60 then being under that brush, commutator segment 58, brush 57, wire 56, winding 21, wire 55, motor 22, wire 75, wire 71, and the thermostat bimetal member 69. The closing of that circuit will, of course, set the damper motor 22 into operation to shift the cam 39 around to the closed damper positions so as to check the fire even though the room thermostat be calling for additional heat. Then when the furnace has cooled, the stack temperature will permit the bimetal member 69 to leave the contact 76 and again go against the contact member 70 whereupon the first indicated circuit is completed through the room thermostat bimetal 67 then being against the contact member 72 so as to cause the damper motor 22 to operate again and restore the switch 33 to the increasing fire condition.

Then, in the normal operation, the room thermostat bimetal 67, when the demand for heat has been met, shifts over against the contact member 66, thereby closing a circuit through various members as follows: contact 66, wire 74, wire 73, brush 61, commutator segment 60 (then being 180 degrees from its position indicated in Fig. 9), commutator segment 58, brush 57, wire 56, winding 21, wire 55, motor 22, wire 75, wire 71, stack thermostat element 69, contact member 70, wire 68, and room thermostat element 67 to close the circuit. Closing of that circuit sets the damper motor 22 into operation to bring it around back to the position as indicated in Fig. 9. That is the position wherein the dampers are closed and only the hold fire switch 34 is operating, it being understood, of course, that the closed damper condition referred to is that condition wherein the ash pit damper 13 is closed and the stack damper 14 is open.

As above indicated, the commutator segments are so arranged in respect to the various brushes in their paths that once any circuit is closed by the thermostat elements 67 and 69, the commutator will revolve through approximately 180 degrees and then come to a stop and be left in a position wherein the other control circuits may again be closed through the commutator for additional operations.

Preferably the stack thermostat 18 is made to have the thermostat member 69 operate so that it is in either of the two extreme positions, either against the member 70 or against the member 76, without stopping therebetween. The mechanical details of such thermostat do not enter into the invention per se, particularly since that unit may be purchased complete at the present time.

Referring now to that modified form of the control unit as shown in Figs. 5–8, instead of employing the two mercury switches 33 and 34, contact switches may be employed to give the same results. In this case, instead of mounting the cams 26 and 27 on the same shaft 25, the cam 26 alone is mounted on the shaft 25 of the motor 24 and the cam 27 is mounted on a separate shaft 78 driven by the motor 24 preferably at the same speed as that of the shaft 25 although this may be varied in accordance with the predetermined requirements for fuel feeding for low fire conditions. To insure positive making and breaking of the circuits with the contact form of switch, I provide an additional cam behind each of the cams 26 and 27, such as is illustrated in Fig. 8 wherein a cam 79 is mounted immediately behind the cam 26 to turn therewith in operation.

A spring contact member 80 has one end curved around to bear against this cam 79 while a second spring contact member 81 has an outer end curved over into the path of the cam 26 to be operated thereby. These contact members 80 and 81 take the place of the terminals within the switch 33. In order to subject the circuit through these contact members 80 and 81 to control through operation of the damper motor 22, instead of employing the push rod 36, I place a spring switch 82 in the path of the cam 39 that is carried on the motor shaft 23 and adjust the cam 39 on that shaft so that when the shaft 23 is turned to that position wherein the draft is cut off through the furnace, this switch 82 by means of a plunger 83 bearing against the cam 39, Fig. 6, is pushed to an open position. The detailed construction of the switch 82 is well known to those versed in the art, since the switch is of that type normally employed to operate in conjunction with doors and the like so as to close when the door opens and open when the door shuts.

Referring to Fig. 10, a wiring diagram is illustrated, employing contact switch members 80, 81, and 86, 93 in place of mercury switches, and the diagram illustrates a control system for forced draft conditions wherein the stack damper must be closed when fuel is fed to the furnace and air is forced in. In this form, the cam 39 directly operates the stoker control switch 82 to close a high voltage circuit (110 volts in present example) to the stoker motor 12 in this case operating a blower as well as the fuel feeding means in the customary manner. The switch 82 is normally biased to a closed position and is opened by the cam 39 pushing on the switch plunger 83. The cam 26 operates to make and break contact between the switch members 80, 81 which are normally in open positions, and the cam 27 operates to make and break contact between the switch members 86, 93 which are normally in closed positions, in the form herein shown. Cams 26 and 27 are arranged to hold the members 80, 81 in the open condition when the members 86, 93 are in the closed condition, and vice versa during rotation of the cam shaft 25.

Referring to Fig. 10, the various elements, such as the stack thermostat 18, room thermostat 20, damper motor 22, and stoker motor 12, are all shown in those positions wherein the entire control system is inoperative due to the fact that the stack thermostat bimetal element 69 has become sufficiently heated at the furnace to shift to the high heat limit side of the thermostat and thereby cut off all control circuits insofar as they may affect the operation of the stoker motor. In this condition, tracing the primary circuits, omitting names of the wires or the elements and simply referring to them by the identifying numerals, starting at the stack thermostat high limit contact 70, the circuit runs through 71, 73, and 61, a brush whose end is in open circuit in reference to the segment 60 of the damper motor driven commutator. Thus it is to be seen that the operation of the stack thermostat to its high limit condition serves as an absolute control on the entire system, preventing operation thereof.

Now assuming that the stack thermostat element 69 drops back against the "cold" contact 76 to restore the control system to an operative condition following the cooling down of the furnace, and also assuming that the room thermostat bimetal element 67 is against its contact 72, which is the condition when the room thermostat is calling for no heat, then the following situations may exist. Beginning with the stack thermostat contact 76, a circuit is had through 95, 86—93, 91, 65, 59, 60, 58, 57, 56, 21, 55, 22, 75, 68, 69, to 76. This completes a circuit including the damper motor 22 and the secondary transformer winding 21 which causes the motor 22 to operate to revolve 180 degrees the commutator segment 60, placing it under the brush 61 and leaving the brush 59 in open circuit. Also the cam 39 has revolved to permit the switch 82 to go to a closed position and thereby close the primary circuit of the stoker motor. Furthermore, the arm 16 has revolved 180 degrees to bring the draft dampers to those positions to permit full draft through the furnace—this condition being necessary at all times when the stoker motor is in operation.

Now since the synchronous motor 24 is in continuous operation irrespective of the stoker motor operation and irrespective of the positions of the two thermostat elements 67 and 69, the cams 26 and 27, driven by the motor 24, will be continuously turning, alternately opening and closing the switch members 80—81 and 86—93. The duration of the closing of each of these switches depends, of course, upon the rate of speed of the driving shaft 25 and the contour or length of the surfaces of the cams 26 and 27. For example, these cams may be driven at a speed that will cause the switches in each instance to operate once every ten or fifteen minutes, this period of time being merely set out as an example without any limitation as to the actual practice since this period is quite variable in accordance with the actual firing conditions encountered.

Keeping in mind that the commutator segment 60 has been carried around under the brush 61 and that the stoker motor 12 is operating, an intermittent control of that stoker motor and of the dampers accordingly is set up through operations of the cams 26 and 27 all during this period when the room thermostat is calling for no heat. In other words these cams serve to change the control circuits whereby the stoker motor is intermittently operated just sufficiently to keep the fire burning properly without giving off an excessive amount of heat or such heat that would materially change the temperatures of the space to be heated. That is to say, a "hold fire" condition is set up even though there be no demand for heat.

Checking again in the diagram of Fig. 10, under this condition, the switch members 86 and 93 are opened after an interval of normal closure as controlled by the cam 27 and, of course, the switch members 80 and 81 then close. The circuit is then from the stack thermostat contact 76 through 95, 92, 80—81, 94, 67, 72, 73, 61, 60 (segment 60 then being under 61), 58, 57, 56, 21, 55, 22, 75, 68, 69 to 76. The creation of this circuit closure causes the motor 22 to operate and return the commutator segment 60 back to the position in Fig. 10 and, furthermore, operates the dampers to the shut off draft condition and also actuates the switch 82 to an open position to stop the stoker motor 12.

Now when the condition exists that the space to be heated requires heat, the room thermostat element 67 shifts into contact with the contact member 66, Fig. 10. It is assumed that the stack thermostat element 69 remains in contact with its "cold" contact 76. Under this condition, there will be no intermittent operation of the dampers and stoker motor but the stoker motor will be set into operation to permit it to continue until the heat demand is satisfied and the room thermostat element 67 switches back over and against the other contact member 72.

With the room thermostat in that condition calling for heat, the control circuit is traced as follows, beginning at the stack thermostat contact member 76 and continuing through 95, 86—93, 91, 65, 59, 60, 58, 57, 56, 21, 55, 22, 75, 68, 69, to 76. The closure of this circuit causes the damper motor 22 to operate, shifting 180 degrees the commutator segment 60 to position it under the brush 61; revolving the arm 16 to shift the dampers to a full open draft condition; and permitting the switch 82 to close and permit the stoker motor 12 to operate. This circuit has been traced in the assumption that the switch members 80 and 81 were initially open and the switch members 86 and 93 were initially closed. If the reverse condition existed, the following circuit would be had to set the stoker motor 12 in operation: 76, 95, 92, 80, 81, 94, 67, 66, 90, 65, 59, 60, 58, 57, 56, 21, 55, 22, 75, 68, 69, to 76. Continuous operation of the cams 26 and 27 thereafter do not cause any changes in either of these circuits such as would again cause the damper motor 22 to operate to stop the stoker motor 12 as long as the room thermostat element 67 is in contact with the contact member 66.

When the heat demand in the space to be heated has been satisfied, the element 67 returns to contact the contact member 72 following which the above described intermittent stopping and starting of the stoker motor is had to hold the fire.

One other condition to be described is that when the furnace becomes heated to the predetermined high limit, the stack thermostat element 69 shifts to that position shown in Fig. 10 to be in contact with its contact member 70. In so doing, the following circuit is established: 70 71, 73, 61, 60 (segment 60 will come under brush 61 during the intermittent operation of the stoker motor as above described), 58, 57, 56, 21, 55, 22, 75, 68, 69. This circuit brings the stoker motor 22 into operation to cause the commutator segment 60 to revolve around to that position indicated in Fig. 10 as well as to permit the switch 82 to go into its "off" position to stop the stoker motor. Should the room thermostat element 67 be against the contact member 66, the same condition would prevail as just described since the circuit would be open in any event between the element 67 and the contact member 72.

The commutator, above described as being mounted on and driven by the shaft 23, is so arranged as has been indicated to control the circuits whereby the shaft 23 revolves 180 degrees and then stops at each energization of the motor 22 so that the segment 60 is always in one of two positions, namely, the position shown in Fig. 10 or in a position under the brush 61. This commutator arrangement is not, per se, a part of this invention but is found in a commercial form of a damper motor unit obtainable upon the market.

In referring to the stoker, I mean to include both solid and liquid fuel feeding devices. Closing the draft after oil firing prevents much heat loss, otherwise occurring by heat escaping up the stack.

While I have herein shown and described my invention in the best form as known to me, it is obvious that structural changes may be employed without departing from the spirit of the invention and I, therefore, do not desire to be limited to that precise form beyond the limitations as may be imposed by the following claims.

I claim:

1. For controlling a motor driven stoker applied to a heater having a draft control damper, a control system comprising in combination, a high temperature limit thermostat switch at the heater; a room temperature responsive thermostat switch; a stoker motor control switch; a damper operating motor; a damper motor control switch operated by the damper motor; means driven by the damper motor to actuate said stoker motor switch; an intermittent switch; a second intermittent switch; means continuously operating both of the intermittent switches between on and off positions at a predetermined rate of speed; and a circuit including a source of electrical energy, said damper motor control switch, said damper motor, said intermittent switches, said room thermostat switch in a room no-heat-demand condition, and said high temperature limit switch, said circuit being closable by one of said intermittent switches through said damper motor control switch only upon said high temperature limit switch being in its cold position, said damper motor control switch being formed to close the circuit through the damper motor to operate that motor to the open draft position and then stop that motor upon each closure of said one intermittent switch, and upon closing of the other intermittent switch, to again close the circuit through said damper motor to cause that motor to operate to the closed draft position, said stoker motor switch being closed and opened by the damper motor in accordance with open draft and closed draft damper positions.

2. For controlling a motor driven stoker applied to a heater having a draft control damper, a control system comprising in combination, a high temperature limit thermostat switch at the heater; a room temperature responsive thermostat switch; a stoker motor control switch; a damper operating motor; a damper motor control switch operated by the damper motor; means driven by the damper motor to actuate said stoker motor switch; an intermittent switch; a second intermittent switch; means continuously operating both of the intermittent switches beween on and off positions at a predetermined rate of speed; and a circuit including a source of electrical energy, said damper motor control switch, said damper motor, said intermittent switches, said room thermostat switch in a room no-heat-demand condition, and said high temperature limit switch, said circuit being closable by one of said intermittent switches through said damper motor control switch only upon said high temperature limit switch being in its cold position, said damper motor control switch being formed to close the circuit through the damper motor to operate that motor to the open draft position and then stop that motor upon each closure of said one intermittent switch, and upon closing of the other intermittent switch, to again close the circuit through said damper motor to cause that motor to operate to the closed draft position, said stoker motor switch being closed and opened by the damper motor in accordance with open draft and closed draft damper positions; and another circuit including said room thermostat switch in a room heat demand position, said damper motor switch, and one of said intermittent switches, said other circuit being arranged to have its said included intermittent switch close the circuit to energize the damper motor to have it operate to its open draft position and stop and remain in that position irrespective of subsequent operations of both intermittent switches until said last circuit is interrupted by said room thermostat switch shifting from said room heat demand position to a no-heat-demand position.

3. For controlling a motor driven stoker applied to a heater having a draft control damper, a control system comprising in combination, a high temperature limit thermostat switch at the heater; a room temperature responsive thermostat switch; a stoker motor control switch; a damper operating motor; a damper motor control switch operated by the damper motor; means driven by the damper motor to actuate said stoker motor switch; an intermittent switch; a second intermmittent switch; means continuously operating both of the intermittent switches between on and off positions at a predetermined rate of speed; and a circuit including a source of electrical energy, said damper motor control switch, said damper motor, said intermittent switches, said room thermostat switch in a room no-heat-demand condition, and said high temperature limit switch, said circuit being closable by one of said intermittent switches through said damper motor control switch only upon said high temperature limit switch being in its cold position, said damper motor control switch being formed to close the circuit through the damper motor to operate that motor to the open draft position and then stop that motor upon each closure of said one intermittent switch, and upon closing of the other intermittent switch, to again close the circuit through said damper motor to cause that motor to operate to the closed draft position, said stoker motor switch being closed and opened by the damper motor in accordance with open draft and closed draft damper positions; said intermittent switches alternating one with the other between said on and off positions.

4. For controlling a motor driven stoker applied to a heater having a draft control damper, a control system comprising in combination, a high temperature limit thermostat switch at the heater; a room temperature responsive thermostat switch; a stoker motor control switch; a damper operating motor; a damper motor control switch operated by the damper motor; means driven by the damper motor to actuate said stoker motor switch; an intermittent switch; a second intermittent switch; means continuously operating both of the intermittent switches between on and off positions at a predetermined rate of speed; and a circuit including a source of electrical energy, said damper motor control switch, said damper motor, said intermittent switches, said room thermostat switch in a room no-heat-demand condition; and said high temperature limit first switch, a second circuit including said electrical energy source, said damper motor, said high temperature limit switch, said damper motor control switch, and either of two parallel branches, one of said branches including said room thermostat switch, in a room heat demand condition and one of said intermittent switches, the other said branch including the other said intermittent switch, said circuit being closable by one of said intermittent switches through said damper motor control switch only upon said high temperature limit switch being in its cold position, said damper motor control switch being formed to close the circuit through the damper motor to operate that motor to the open draft position and then stop that motor upon each closure of said one intermittent switch, and upon closing of the other intermittent switch, to again close the circuit through said damper motor to cause that motor to operate to the closed draft position, said stoker motor switch being closed and opened by the damper motor in accordance with open draft and closed draft damper positions; said intermittent switches alternating one with the other between said on and off positions, said second circuit being closable through either one of said intermittent switches to operate the damper motor and the stoker motor to respective open draft and operating conditions, whereby said conditions will continue until the room thermostat switch restores said intermittent switches to intermittent control by moving to the no heat demand position.

5. For a system having a heater, a heater draft damper, space to be heated, and a motor driven stoker for supplying fuel to said heater, a stoker control comprising a damper operating motor; a heater temperature responsive thermostat having "cold" and "hot" circuit closing positions; a space temperature responsive theremostat having "cold" and "hot" circuit closing positions; a damper motor switch; time controlled hold-fire means periodically causing energization through said space thermostat in its "hot" position and the heater thermostat in its "cold" position and said damper motor switch of the damper motor to open draft position and subsequently to closed draft position; and means actuated by the damper motor causing energization and deenergization of the stoker motor in accordance with said open and closed draft positions.

6. For a system having a heater, a heater draft damper, space to be heated, and a motor driven stoker for supplying fuel to said heater, a stoker control comprising a damper operating motor; a heater temperature responsive thermostat having "cold" and "hot" circuit closing positions; a space temperature responsive thermostat having "cold" and "hot" circuit closing positions; a damper motor switch; time controlled hold-fire means periodically causing energization through said space thermostat in its "hot" position and the heater thermostat in its "cold" position and said damper motor switch of the damper motor to open draft position and subsequently to closed draft position; and means actuated by the damper motor causing energization and deenergization of the stoker motor in accordance with said open and closed draft positions; and means maintaining said damper motor in its open draft position irrespective of said time controlled means during call for heat in said space as indicated by said space thermostat; said time controlled means taking over control of the damper motor upon said space heat call being satisfied.

7. For a system having a heater, a heater draft damper, space to be heated, and a motor driven stoker for supplying fuel to said heater, a stoker control comprising a damper operating motor; a heater temperature responsive thermostat having "cold" and "hot" circuit closing positions; a space temperature responsive thermostat having "cold" and "hot" circuit closing positions; a damper motor switch; time controlled hold-fire means periodically causing energization through said space thermostat in its "hot" position and the heater thermostat in its "cold" position and said damper motor switch of the damper motor to open draft position and subsequently to closed draft position; and means actuated by the damper motor causing energization and deenergization of the stoker motor in accordance with said open and closed draft positions; and means maintaining said damper motor in its open draft position irrespective of said time controlled means during call for heat in said space as indicated by said space thermostat; said time controlled means taking over control of the damper motor upon said space heat call being satisfied; and said heater thermostat removing both said space thermostat and said time controlled means from control of said damper motor upon said heater reaching a predetermined high temperature limit.

ARMAND T. RANKIN.